N° 65,868.

Frederick A. Bolles
Improvement in Cornshellers

Witnesses.
Martin Newman
Frank G. Bolles

Inventor:
Frederick A. Bolles

United States Patent Office.

FREDERICK A. BOLLES, OF UNADILLA, NEW YORK.

*Letters Patent No. 65,868, dated June 18, 1867.*

---

CORN-SHELLER.

---

*The Schedule referred to in these Letters Patent and making part of the same.*

---

TO ALL WHOM IT MAY CONCERN:

Be it known that I, FREDERICK A. BOLLES, of Unadilla, county of Otsego, in the State of New York, have invented a new and useful improvement in Corn-Shellers; and I do hereby declare that the following is a full, clear, and exact description of the construction and operation of the same, reference being had to the annexed drawings, making a part of this specification, in which—

Similar letters of reference where they occur in the separate figures denote like parts of the machine in all the drawings.

My invention consists in constructing a corn-sheller with a toothed cylinder running within a concave case which is toothed in a similar manner, or longitudinal ribs, as may be deemed best. The said cylinder is suspended upon springs, (which may be rubber or other suitable material,) which admits of the cylinder yielding to suit any size of ears of corn on entering, and continuing its pressure until the naked cob leaves the machine.

To enable others skilled in the art to manufacture and use my invention, I will proceed to describe the same with reference to the drawings.

Figure 1:
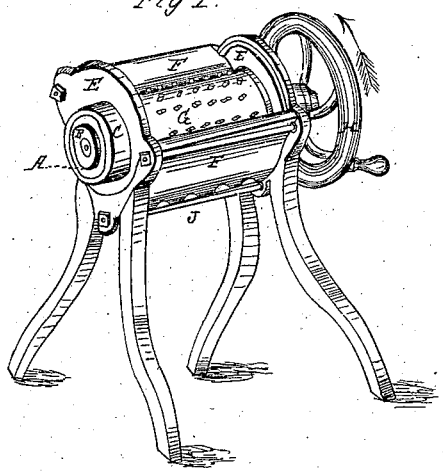
Figure 1 is a perspective view.
Figure 2:
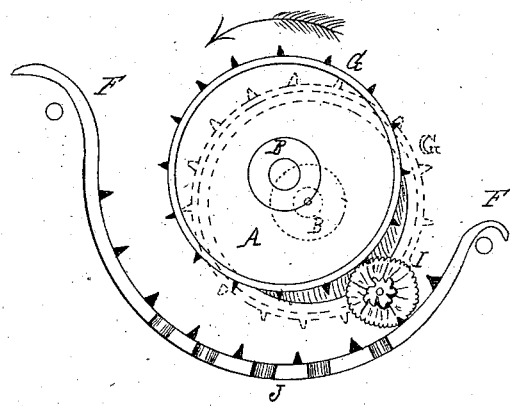
Figure 2 is a transverse section.

On a suitable frame, E E, I mount a toothed or ribbed concave, F F, which is provided with holes J on its lower side for the discharge of the shelled corn. Within this concave I mount a toothed cylinder, G, provided with a fly-wheel and crank-pin, H, which may be driven by any suitable motive power in the direction shown by the arrows. The journals of the cylinder G run in a short tube-like box, B, which is placed within the eye of a rubber-disk spring, A, which is secured in its place on the frame E E by means of the cap-piece C. With this arrangement I am enabled to have the concave stationary and fixed; and the cylinder yields to suit the various sizes of ears of corn and cob by means of the compression of the rubber-disk springs A on the side of the disk opposite from the corn or cob I, as shown in fig. 2. Fig. 2 represents a transverse section, showing the position of the cylinder, by the dotted lines, when there is no resistance from the act of shelling. I represents a section of cob, and showing the position that the cylinder G and the rubber spring A assume when in the act of shelling and discharging the cob I.

The advantage of thus making a yielding cylinder is, that the machine will better adapt itself to the ears of corn, and is much stronger and substantial, and much cheaper constructed, and shells corn much more easily than machines constructed with the concave being made to yield instead of the cylinder.

Having thus fully described my invention, what I claim, is—

Combining with a stationary concave a yielding shelling-cylinder by means of springs, as shown and described. Said springs may be made of rubber or steel, or any other suitable material, when constructed as and for the purpose substantially as herein specified.

FREDERICK A. BOLLES.

Witnesses:
MARTIN NEWMAN,
FRANK G. BOLLES.